United States Patent [19]

Martin

[11] Patent Number: 4,472,088
[45] Date of Patent: Sep. 18, 1984

[54] MINING ROOF BOLT

[76] Inventor: W. James Martin, 253 Glendale St., Salt Lake City, Utah 84104

[21] Appl. No.: 370,361

[22] Filed: Apr. 21, 1982

[51] Int. Cl.³ .............................................. E21D 21/00
[52] U.S. Cl. .................................. 405/259; 405/258; 52/698; 52/704
[58] Field of Search ............... 405/259, 261, 260, 244, 405/238, 239, 240, 241, 242; 16/39, 40, 41; 403/227, 297; 52/698, 701, 704; 411/37, 38

[56] References Cited

U.S. PATENT DOCUMENTS

| | | | |
|---|---|---|---|
| 2,456,480 | 12/1948 | Austin | 403/227 X |
| 2,520,375 | 8/1950 | Roe | 403/372 X |
| 2,904,379 | 9/1959 | Nelson | 403/297 |
| 2,950,602 | 8/1960 | Lang | 405/259 X |
| 3,504,498 | 4/1970 | Triplett | 405/259 X |
| 3,754,401 | 8/1973 | Lipow | 405/259 |
| 4,051,681 | 10/1977 | Qaros | 405/261 |
| 4,216,180 | 8/1980 | Seemann et al. | 405/261 X |

FOREIGN PATENT DOCUMENTS

| | | | |
|---|---|---|---|
| 1312011 | 11/1962 | France | 411/37 |
| 649857 | 2/1979 | U.S.S.R. | 405/261 |

*Primary Examiner*—Dennis L. Taylor
*Attorney, Agent, or Firm*—Thorpe, North & Western

[57] ABSTRACT

A mining roof bolt structure includes an elongate bolt having a head and a threaded shank, a cylindrical sleeve made of a compressible and expandible material disposed about a substantial portion of the length of the shank, a cap nut having a diameter greater than the diameter of the sleeve when the sleeve is not compressed, for engaging the walls of a hole into which the roof bolt is inserted, with the cap nut being screwable onto the threaded shank to contact one end of the sleeve, and a holding plate disposed on the shank of the bolt between the sleeve and the bolt head so that the plane of the plate is generally perpendicular to the shank of the bolt. As the bolt is tightened on the cap nut in the hole, the sleeve is compressed longitudinally to thereby cause it to expand radially and contact the side walls of the hole. This secures the roof bolt structure in place to provide support for the roof or wall in which the hole is located.

5 Claims, 3 Drawing Figures

MINING ROOF BOLT

BACKGROUND OF THE INVENTION

This invention relates to a method and structure for providing support for walls and ceilings of underground tunnels by inserting bolts into holes drilled in the walls and ceilings.

Artificial roof and wall support in underground mines has been utilized for many years to protect men and equipment from cave-ins or other mine failures, and to maintain a mine open and accessible over extended periods of time. One method of providing such artificial support is by way of roof bolts placed in holes drilled in the mine walls and ceilings. The use of roof bolts has proven to be effective in increasing a mine's structural stability and in preventing accidents and injuries caused by cave-ins.

Mining roof bolts in current use generally fall into three categories identified as point-anchor bolts, full contact bolts, and combination bolts (there may be other categories of mining roof bolts not mentioned). A point-anchor bolt is one which is anchored in place in a hole in the mine roof or wall by some mechanical anchor on the end of the bolt away from the bolt head. As the bolt is tightened ("torqued"), the mine strata (layers of rock) are compressed together between the bolt head and mechanical anchor to thereby stabilize the strata. Point-anchor bolts are relative inexpensive, and therefore are quite popular, but they have a number of disadvantages including the tendency of the bolt to creep or slip with the passage of time resulting in a loss of needed roof tension and thus support. This gives rise to a need to retorque the bolt—a dangerous and expensive procedure. Another disadvantage is that the rock near the point of anchoring is oftentimes caused to fracture. And furthermore, in wet mine environments, corrosion or disintegration of the rock and roof bolt result. Finally, the point anchor bolt is not suitable for use in soft rock such as coal, shale, etc.

The full contact bolt provides for anchoring the bolt in the bore hole along the substantially full length of the bolt. This type of configuration gives added strength and is fairly resistent to creep or slippage. Two examples of full contact bolts are the resin bolt and the Scott split set. The resin bolt consists of resin cartridges which are placed in the hole and a bolt similar to a length of rebar which is inserted in the hole and then spun to break the resin cartridges and allow the resin to fill the hole and harden. The resin bolt, although providing full length anchorage, is fairly costly and difficult to install. The Scott split set (this may be a trademark of Ingersol Rand) consists of a hollow, compressible steel tube having a slit formed along its length along one side. The tube is compressed and driven with considerable force into a hole. The tube expands in the hole and secures itself against the walls of the hole. Like the resin bolt, the split set distributes the anchoring force along the length of the tube. Disadvantages of the Scott Split Set include difficulty of installation, tendency to fracture the rock as the bolt is driven into place, and limited effectiveness in irregular holes and in stratified layers of various hardnesses such as is common in mines. The reason for this limited effectiveness is that the tube, as it expands, does not compliantly conform to hole shape. The hard layers of rock prevent the steel tube from expanding and exerting a uniform pressure on the soft rock and as a result the overall load capacity is reduced.

Prior art patents which illustrate various roof bolts structures and also various anchoring devices generally include L. Triplett, U.S. Pat. Nos. 3,504,498, L. Triplett, 3,492,909, O. H. Varga, 4,108,043, J. C. Lang, 2,950,602, J. E. Munn, 3,349,567, I. Cohen, 3,017,800, and R. S. Peirse, 2,203,178. The arrangements disclosed in these references include one or more of the disadvantages of the roof bolts discussed above or are simply not applicable to providing the desired roof and wall support needed in underground mining.

SUMMARY OF THE INVENTION

It is an object of the invention to provide an inexpensive, easy to install mine roof bolt.

It is another object of the invention to provide such a roof bolt which provides for anchoring substantially along the full length of the bolt.

It is a further object of the invention to provide such a roof bolt which will provide immediate support upon installation thereof.

It is still another object of the invention to provide a mining roof bolt which will effectively and safely secure a mine roof against cave-ins.

It is also an object of the invention to provide such a roof bolt which is suitable for use in mine strata of various hardnesses.

It is an additional object of the invention to provide such a roof bolt which may be recovered and used again in other locations.

The above and other objects of the invention are realized in a specific illustrative embodiment thereof which includes an elongate bolt having a head and a shank, at least a portion of which is threaded, a cylindrical sleeve made of a deformable material disposed about a substantial portion of the length of the shank, with the material being compressible along its length and expandible radially, a cap nut having a diameter greater than the diameter of the sleeve when the sleeve is not compressed, for engaging the walls of a hole into which the bolt is inserted, with the cap nut being screwable onto the threaded shank to contact one end of the sleeve, and a holding plate disposed on the shank of the bolt between the sleeve and the bolt head so that the planar of the plate is generally perpendicular to the shank of the bolt. In use, the bolt is inserted into a hol in a mine roof or wall and then the bolt is tightened or torqued causing the distance between the cap nut and the holding plate to shorten to thereby compress the sleeve in the longitudinal direction. Such compression causes the sleeve to expand radially to engage the side walls of the hole and to fill the gaps in the hole. This secures the roof bolt in place, tends to bind or compress the stratified rock together, and anchors the bolt in any overlying mass of solid rock (overlying material of the immediate roof) into which the bolt is inserted. In this manner, mine roofs and walls may be greatly stengthened.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION OF THE INVENTION

Figure 1:
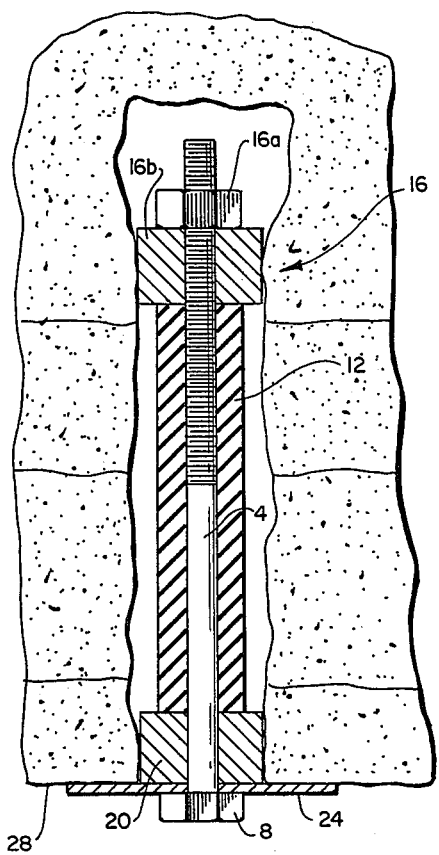
FIG. 1 is a longitudinal cross-section of a mining roof bolt made in accordance with the principles of the present invention.
Figure 2:
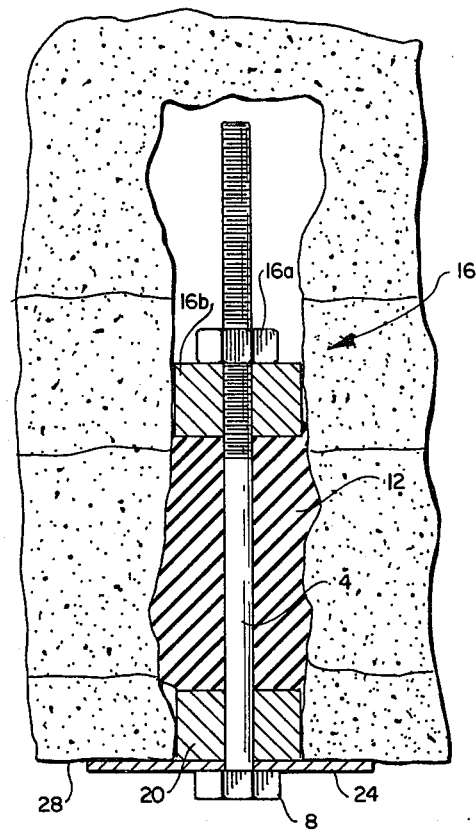
FIG. 2 is a longitudinal cross-section of a mining roof bolt shown in the compressed, installed configuration.

Referring to FIGS. 1 and 2, there is shown a mining roof bolt which includes an elongate shaft 4 having a conventional hex head 8 at one end and being threaded at the opposite end. Advantageously the shank 4 is about two or more feet in length and has a diameter of about ⅜ inches to 1 inch. A sleeve 12, constructed of elastomeric material such as neoprene rubber or the like, is positioned about the shank 4 as shown. The sleeve 12 extends longitudinally substantially the full length of the shank 4. The diameter of the sleeve 12 might illustratively be about two inches.

A cap nut 16, composed of a hex portion 16a and a retainer portion 16b, is screwed onto the end of the shank 4 so that the retainer portion thereof contacts one end of the sleeve 12. Advantageously, the cap nut is made of steel. A retainer collar 20 is positioned on the shank 4 at the opposite end from the cap nut 16 to contact the other end of the sleeve 12. A holding plate 24 is also positioned about the shank 4 between the collar 20 and head 8.

FIGS. 1 and 2 respectively show the mining roof bolt in the uncompressed configuration and in the compressed, installed configuration. Installation of the bolt is carried out simply by inserting the assembly shown in FIGS. 1 and 2 into a bore hole formed in the wall or ceiling of a mine so that the cap nut 16 is in contact with the side walls of the hole as indicated in FIG. 1. The head 8 of the bolt is then turned to cause the cap nut 16 to be screwed onto the shank 4 to force the retainer portion 16b of the cap nut down against the sleeve 12 causing the sleeve to compress. As the sleeve is compressed, its shear strength is increased, and it expands radially outwardly, as indicated in FIG. 2, to fill the cracks and openings in the walls of the hole and to create friction between the sleeve 12 and the hole walls. This secures the bolt assembly firmly in the bore hole. As the bolt head 8 is tightened, the holding plate 24 is drawn upwardly against the wall or ceiling surface 28, as also shown in FIG. 2. With the roof bolt in place, the holding plate 24 serves to support the rock above it, while, at the same time, the outward pressure exerted by the expanded sleeve 12 serves to compress the surrounding rock strata longitudinally and radially thus increasing the stability of the wall or roof into which the bolt is placed.

The roof bolt shown in FIGS. 1 and 2 provide the advantages of being simple in construction and easy to install. Further, the bolt is self anchoring along substantially the full length of the bolt shank and the flexible, deformable sleeve enables the exertion of fairly uniform pressure against the hole walls to create friction and holding power in both hard and soft rock even if in alternating rock layers.

Figure 3:
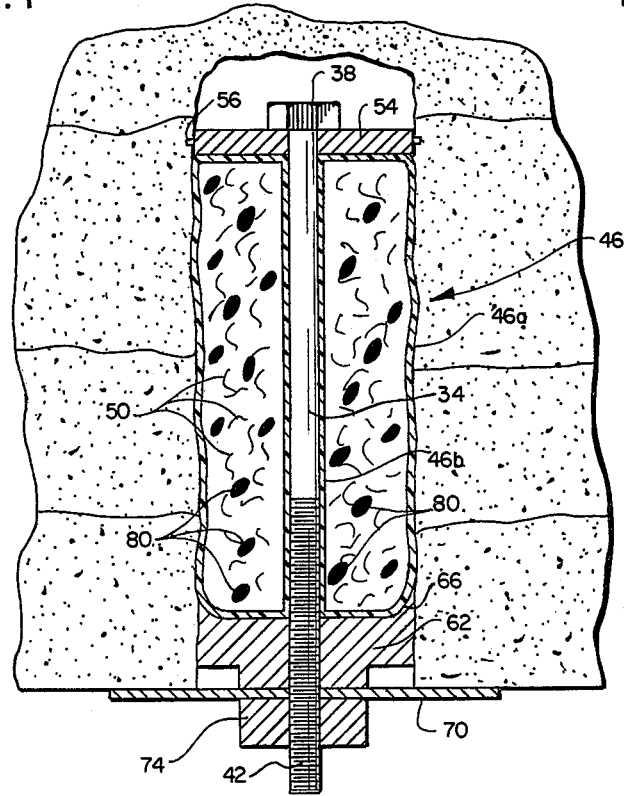
FIG. 3 is a longitudinal cross-section of another embodiment of a mining roof bolt made in accordance with the present invention.

FIG. 3 shows an alternative embodiment of a mining roof bolt made in accordance with the present invention. This bolt assembly includes a shank 34 having a conventional hex head 38 at one end, with the other end 42 being threaded. Disposed about the shank 34 is a hollow casing 46 made of a flexible material such as polyethylene. The casing 46 is generally cylindrical having an outer wall 46a and an interior wall 46b which defines a central channel through which a shank 34 is inserted. Contained in the casing 46 are elastomeric particles 50, such as shreaded rubber. The particles 50 are of sufficient quantity to substantially fill the casing 46.

Disposed between the bolt head 38 and the casing 46 is a retainer device 54 in the form of a washer 54 welded or otherwise attached to the shank 34. The washer 54 may include finger elements 56 for contacting the side walls of the bore hole to prevent turning of the shank 34 when the roof bolt is torqued (to be discussed hereafter). The washer 54 is dimensioned to enable insertion thereof in the bore hole. Disposed on the threaded end of the shank 34 is a retainer collar 62 having a lip 66 which projects upwardly from the perimeter of the collar. The collar 62 is provided to contain and prevent longitudinal movement of the casing 46. The collar 62 may either be screwable onto the threaded end of the shank 34 or it may be simply slideable onto the shank. A holding plate 70 is placed on the threaded end of the shank to abut the collar 62, and a conventional hex nut 74 is screwed onto the threaded end 42 of the shank 34. The hex nut 74 retains the holding plate 70 and collar 62 in place.

In use, the bolt of FIG. 3 is placed in a bore hole in the manner shown in FIG. 3, together with the casing 46, and the hex nut 74 is tightened to force the wahser 54 downwardly onto the casing 46 which is thus compressed between the washer 54 and the retainer collar 62. The elastomeric particles 50 are thereby caused to expand outwardly and thus expand the casing 46 so that it fills in the gaps and cracks in the walls of the bore hole. In this manner, the roof bolt of FIG. 3 is secured in place to secure and strengthen a mine roof.

To further bind and hold the elastomeric particles 50 together and thereby firm-up the casing 46, plastic capsules 80 containing a common liquid adhesive or binding agent may be provided within the casing. Then, when the casing 46 is compressed, the pressure on the capsules causes the capsules to burst and release the adhesive to flow to the adjacent particles to bind them together after the casing has been compressed. Of course, other arrangements could be employed for distributing a binding agent among the elastomeric particles to bind them together.

It is to be understood that the above described embodiments of the present invention are only illustrative and that numerous alternative arrangements could be devised by those skilled in the art without departing from the spirit and scope of the invention. For example, a variety of materials could be used for the sleeve 12 and for the elastomeric particles 50. Also, there are a variety of arrangements by which the casing 46 is held in place and compressed. Also, the positions of the bolts in the bore hole, whether the bolt head remains out of the hole or is disposed in the hole, may be changed from those embodiments shown and described without departing from the present invention. The appended claims are intended to cover all such alternative embodiments and arrangements.

What is claimed is:

1. A mining roof bolt for anchoring in holes in mine roofs and walls comprising an elongate bolt having a head and a shank, at least a portion of which is threaded, a generally cylindrical hollow casing made of a deformable material and surrounding the shank along a substantial portion of the length thereof, elastomeric particles disposed in and substantially filling the casing, a cap nut having a diameter greater than the diameter of said sleeve when the sleeve is not compressed, for engaging the walls of the hole into which the bolt is inserted, said cap nut, being screwable onto the threaded shank to contact one end of the sleeve, a holding plate disposed on the shank of the bolt between the sleeve and the bolt head so that the plane of the plate is generally perpendicular to the shank of the bolt, and a retainer collar disposed about the shank between the sleeve and the holding plate, and dimensioned so that it will extend at least partly into the hole when the bolt is placed in the hole to contact the other end of the sleeve.

2. A mining roof bolt as in claim 1 wherein said particles are comprised of rubber.

3. A mining roof bolt as in claim 1 wherein said casing is comprised of polyethylene.

4. A mining roof bolt as in claim 1 wherein said retainer collar includes a lip which projects upwardly toward the bolt head from the perimeter of the collar to generally circumscribe one end of the casing.

5. A mining roof bolt for anchoring in holes in mine roofs and walls comprising an elongate bolt having a head and a threaded shank, a cylindrical, hollow casing disposed about the shank of said bolt along a substantial portion of the length thereof, said casing being made of a deformable material, elastomeric particles disposed in and substantially filling said casing, a plurality of burstable capsules distributed throughout the elastomeric particles in the casing, said capsules containing an adhesive which, when the capsules are burst, flows to the particles to bind them together, a first retaining element disposed on the shank of the bolt between the bolt head and casing for contacting one end of the casing and preventing longitudinal movement thereof, and a second retaining element screwable onto the threaded shank for contacting the other end of the casing and preventing longitudinal movement thereof.

* * * * *